UNITED STATES PATENT OFFICE.

EDWIN B. BARNES, OF BOSTON, MASSACHUSETTS, ASSIGNOR OF ONE-THIRD TO IDA M. DAMRELL AND ONE-THIRD TO OLGA E. E. BLASSER, BOTH OF BOSTON, MASSACHUSETTS.

PAINT.

1,311,945.      Specification of Letters Patent.      Patented Aug. 5, 1919.

No Drawing.      Application filed December 20, 1918. Serial No. 267,708.

*To all whom it may concern:*

Be it known that I, EDWIN B. BARNES, a citizen of the United States, residing in Boston, in the county of Suffolk and State of Massachusetts, have invented an Improvement in Paint, of which the following description is a specification.

This invention relates to paints and has for its object to provide a rust and gas resisting paint which is especially adapted for use as a protective coating for metal objects, and which is durable and inexpensive. To this end I employ as the base of the paint a clay body in dry form and known in the market as china clay, a binder for the clay and a solvent for the binder.

The binder, which I employ is a wax, preferably beeswax, and the solvent for the wax preferred by me is turpentine, which solvent is volatile and evaporates after the paint has been applied to the surface to be protected, leaving the said surface covered by a layer of china clay held together by the wax binder.

The china clay constitutes the bulk of the paint being present largely in excess of the wax, and in order that the invention may be clearly comprehended, I will set forth in detail one set of proportions and the method of compounding the same to produce one gallon of my improved paint.

To this end, I take three quarts of turpentine and place in a vessel of sufficient size to hold more than a gallon of paint. To the turpentine I add one-half pound of wax, preferably beeswax, and to facilitate the solution of the wax, I dissolve the same in a small quantity of the turpentine by heat over a water bath and add the solution of wax to the vessel containing the turpentine. To this solution I then add the china clay in small quantities and stir the solution after each addition of the china clay until the latter has been taken up by the wax solution, and repeat this operation until six pounds of the china clay have been added to the wax solution.

The china clay is normally light and bulky, but is readily absorbed by the wax solution when stirred therein, and the product produced is a paint which will flow the same as an ordinary paint and which can be applied to the surface to be protected by a brush or by immersion of the article in the paint. After the paint has been applied to the surface to be protected, the turpentine evaporates in a relatively short time and leaves a firm, dense protective coating composed of the china clay and the wax binder, which coating is durable, flexible, weatherproof, and highly resistive to gases and fumes and fire, and in which the clay acts as an insulator and protector for the wax and the latter acts as a binder for the clay and imparts flexibility to the layer of paint and prevents cracking and peeling of the same.

The paint composed of china clay and wax is white in color and if it is desired to impart to it any other color, such as red, yellow, etc., it is only necessary to add a dry coloring matter to obtain the color desired.

If the paint produced by the addition of the china clay to the wax solution should be too thick to flow readily, it may be thinned by the addition of more turpentine or by the addition of a very small quantity of linseed or other oil, as, for instance, two teaspoonfuls of linseed oil to a gallon of paint.

The paint is especially useful for protecting metal from the corrosive action of the weather, gases and fumes, and can be applied to a rusted metal surface as well as to a clean metal surface, and be effective as a protective coating.

From the above description, it will be seen that the paint consists essentially of a clay body which is resistive to atmospheric conditions, gases and fumes and fire and which is bound together by a binder of wax which is present in materially less quantity and it is preferred to use only sufficient wax to effectively bind the clay together to form a flexible layer or coating without impairing the fire and rust resisting properties of the clay. If desired the layer or coating of paint after being applied to the surface to be protected can be rubbed down and polished which adds to its value as a paint for interior use. While it is preferred to use turpentine as a solvent for the wax, it is not desired to limit the invention in this respect.

The improved paint is also highly useful as a filler for cement and wood.

When used for exterior work a single application serves as a priming and finishing coat, hence reduces to a minimum the cost of painting exterior surfaces.

Claims.

1. A paint composed essentially of china clay, beeswax and turpentine, the china clay being materially in excess of the beeswax.

2. A paint composed essentially of china clay, a binder of wax for the china clay and a solvent for the wax, the china clay being materially in excess of the wax.

3. A paint composed essentially of a dry clay body, a binder of wax, and a volatile solvent for the wax, the dry clay being materially in excess of the wax.

4. A paint composed of dry china clay, wax, turpentine and an oil, the clay being materially in excess of the wax, and the oil being present in less quantity than the turpentine.

In testimony whereof I have signed my name to this specification.

EDWIN B. BARNES.

Copies of this patent may be obtained for five cents each, by addressing the "Commissioner of Patents, Washington, D. C."